UNITED STATES PATENT OFFICE.

EMIL A. DE SCHWEINITZ, OF WASHINGTON, DISTRICT OF COLUMBIA; F. H. FRIES, EXECUTOR OF SAID DE SCHWEINITZ, DECEASED, ASSIGNOR, BY DIRECT AND MESNE ASSIGNMENTS, OF ONE-FOURTH TO JOHN C. PENNIE, OF WASHINGTON, DISTRICT OF COLUMBIA, AND ONE-HALF TO R. J. REYNOLDS TOBACCO COMPANY, OF WINSTON SALEM, NORTH CAROLINA, A CORPORATION OF NEW JERSEY.

TREATING TOBACCO.

No. 862,115.     Specification of Letters Patent.     Patented July 30, 1907.

Application filed February 4, 1897. Serial No. 622,034.

*To all whom it may concern:*

Be it known that I, EMIL A. DE SCHWEINITZ, a citizen of the United States, residing at Washington, in the District of Columbia, have invented certain new and useful Improvements in Treating Tobacco; and I do hereby declare the following to be a full, clear, and exact description of the invention, such as will enable others skilled in the art to which it appertains to make and use the same.
The flavor of tobacco is largely due to the action thereon (during curing and manufacture of the tobacco) of the micro-organisms which have their habitat upon the leaves. These micro-organisms differ in different grades or qualities of tobacco and according to their particular character or organization act upon the leaves to impart distinct flavors thereto. The chemical action is obscure, but is supposed to be due to changes effected in the albuminoids, sugars, or other constituents of the tobacco, through the influence of the particular kind of micro-organism present. The unpleasant flavor of some tobacco is attributable in large measure to the activity of its particular adherent micro-organism, as is also the agreeable flavor of other tobacco to the activity of their characteristic micro-organisms.
The object of my invention is to alter the flavor of the tobacco treated and to improve its color, if it has been imperfectly cured. To this end, I first destroy the micro-organisms existing upon the tobacco treated. This may be done by subjecting the micro-organisms to a temperature sufficient to kill them, as, for instance, a temperature of say 155° Fahr. to 160° Fahr. Preferably, however, I destroy the micro-organisms by exposing them to the effects of formaldehyde, preferably applied in the form of an atmosphere impregnated with from four to five per cent. of formaldehyde gas, and I employ this gas for the further reason that I have discovered that when its action upon the leaves is continued for some time after the micro-organisms have been destroyed, such portions of the leaves as have remained green after imperfect curing, are improved both in color and flavor, independent of the effect of the gas upon the micro-organisms. I desire therefore to be understood as intending to claim the use of formaldehyde for improving the color and flavor of the tobacco, aside from its function of destroying the micro-organisms.

After the micro-organisms have been destroyed upon the tobacco, I proceed to colonize thereon the micro-organisms found on the tobacco having the flavor desired. This may be effected by mixing the tobacco, deprived of its living micro-organisms, with the tobacco having the flavor desired and whereon the micro-organisms still exist, and permitting the mixed grades in a moist condition to ferment until the micro-organisms have effected the changes that produce the characteristic flavor desired. Or, if desired, an infusion, in water or licorice, may be made of the tobacco having the flavor desired, whereupon, the tobacco previously deprived of its micro-organic life, as described, may be sprinkled with the infusion and permitted to ferment as before. Or, further, cultures may be made of the micro-organisms characteristic of the tobacco having the flavor desired, and these cultures may be utilized to colonize the tobacco previously deprived of its own micro-organic life, whereupon, subsequent fermentation, as in both of the other instances, brings about the desired change in flavor.

It will, of course, be understood that subsequent to the fermentation and its completed result, the leaves of tobacco are treated in the usual way according to the purpose for which they are ultimately intended, as, for instance, for cigar wrappers or fillers, long or short cut smoking tobacco, plug, or the like.

In some instances, I may, after depriving the tobacco to be treated of its micro-organic life, colonize thereon the micro-organisms of more than one of the other classes or grades. In all instances, to render the colonization effectual, I will, as before, subject the colonized tobacco to conditions favorable to the action of the micro-organisms upon the leaf, as, for instance, by subjecting the colonized leaf to fermentation until the desired result is effected.

In the preliminary treatment with formaldehyde, the tobacco should preferably be "in order" as it is termed in the trade, *i. e.*, in a sufficiently soft and moist condition to be handled without breaking. In fact, I may even employ the formaldehyde treatment while the tobacco is being cured.

The formaldehyde acts chemically upon the albuminoids, the coloring matter, the amido-acids, the acid amids, the nicotin, the ammonia derivatives and probably the sugars, forming with them combinations which have altogether different flavors and properties readily cognizable to those skilled in the art. These so-called "condensation products," which are easily formed and are characteristic of aldehydes, are very important. The change in color is probably due to the reducing action of the formaldehyde.

The time necessary for the fermentation of tobacco when both good and bad ferments are present is longer than when the bad ferments are eliminated, for the reason that the amines and other putrefactive substances formed, tend to retard the action of the useful germs, which must counteract these products, as well as form new ones. The employment of formaldehyde in my process not only entirely stops the activity of the bad ferments but also converts the aforesaid substances into condensation products of harmless or agreeable character, and the tobacco is so far improved in quality that the useful germs can produce the desired products more readily and effectively.

Having thus described my invention, what I claim is

1. The method of developing a desired flavor in tobacco which consists in destroying the micro-organic life thereon, colonizing upon the tobacco thus treated the micro-organisms characteristic of another grade, and then subjecting the colonized tobacco to fermentation.

2. The process of treatment of tobacco, consisting in, first, sterilizing the same, under such conditions and sufficiently long-continued as to destroy the original bacteria and spores existing thereon, then adding to the sterilized tobacco bacteria or cultures thereof to produce a new and characteristic flavor, and then subjecting the tobacco to fermentation, substantially as and for the purpose described.

3. The process of changing the flavor of tobacco, which consists in first freeing the tobacco of the species of bacteria originally existing thereon and then adding in place thereof bacteria or cultures thereof, to produce a new and characteristic flavor, and also a material suitable for bacterial food, and then subjecting the tobacco to fermentation, substantially as described.

4. The method of improving the color and flavor of tobacco which consists in subjecting it to the action of formaldehyde until the desired change in color and flavor has taken place.

5. The method of improving the color and flavor of tobacco which consists in subjecting it to the action of an atmosphere charged with formaldehyde until the desired change in color and flavor has taken place.

6. The method of developing a desired flavor in tobacco, which consists in destroying the micro-organic life thereon by subjecting the tobacco to the action of formaldehyde, colonizing upon the tobacco thus treated the micro-organisms characteristic of another grade, and then subjecting the colonized tobacco to fermentation.

In testimony whereof I affix my signature, in presence of two witnesses.

EMIL A. DE SCHWEINITZ.

Witnesses:
JOHN C. PENNIE,
JOHN E. MITCHELL.